United States Patent
Taniguchi et al.

(10) Patent No.: US 8,534,236 B2
(45) Date of Patent: Sep. 17, 2013

(54) OXYFUEL COMBUSTION BOILER PLANT AND OPERATION METHOD OF OXYFUEL COMBUSTION BOILER PLANT

(75) Inventors: Masayuki Taniguchi, Hitachinaka (JP); Tsuyoshi Shibata, Hitachiota (JP); Yoshiharu Hayashi, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 534 days.

(21) Appl. No.: 12/893,711

(22) Filed: Sep. 29, 2010

(65) Prior Publication Data
US 2011/0073051 A1    Mar. 31, 2011

(30) Foreign Application Priority Data
Sep. 30, 2009    (JP) ................... 2009-225912

(51) Int. Cl.
*F23B 80/02*    (2006.01)

(52) U.S. Cl.
USPC ........ 122/406.1; 122/4 D; 110/345; 110/204; 110/205

(58) Field of Classification Search
USPC .............. 122/406.1, 4 D, 414, 415; 110/234, 110/341, 345, 204, 205, 347, 348
See application file for complete search history.

(56) References Cited

U.S. PATENT DOCUMENTS

| | | | |
|---|---|---|---|
| 2008/0184736 A1 | 8/2008 | Peyron | |
| 2009/0013871 A1* | 1/2009 | Darde et al. | ............ 95/129 |
| 2010/0212555 A1* | 8/2010 | Yamada et al. | ............ 110/186 |
| 2010/0242811 A1* | 9/2010 | Court et al. | ............ 110/203 |
| 2011/0048295 A1 | 3/2011 | Yamada et al. | |
| 2011/0294077 A1* | 12/2011 | Seltzer et al. | ............ 431/12 |

FOREIGN PATENT DOCUMENTS

| | | |
|---|---|---|
| JP | 5-26409 A | 2/1993 |
| JP | 6-101809 A | 4/1994 |
| JP | 7-305830 A | 11/1995 |
| JP | 7-318016 A | 12/1995 |
| JP | 2006-504927 A | 2/2006 |
| WO | WO 2004/042276 A2 | 5/2004 |
| WO | WO 2009/110031 A1 | 9/2009 |

OTHER PUBLICATIONS

European Search Report dated Jan. 24, 2012 (four (4) pages).

* cited by examiner

*Primary Examiner* — Gregory A Wilson
(74) *Attorney, Agent, or Firm* — Crowell & Moring LLP

(57) ABSTRACT

An oxyfuel combustion boiler plant comprising: a boiler having an air separation unit for manufacturing oxygen by separating nitrogen from air, a burner for burning the oxygen supplied from the air separation unit and pulverized coal, and a primary system pipe for supplying the pulverized coal to the burner, exhaust gas recirculation system pipe for supplying combustion exhaust gas discharged from the boiler to the primary system pipe, a carbon dioxide capture unit for capturing carbon dioxide in the exhaust gas discharged from the boiler, the oxyfuel combustion boiler plant is further comprising: an oxygen buffer tank disposed on a downstream side of the air separation unit; an oxygen supply pipe for supplying oxygen to the primary system pipe of the burner from the oxygen buffer tank; and a nitrogen supply pipe for supplying a part of nitrogen generated from the air separation unit or an air supply pipe for supplying air from outside which is connected to the oxygen supply pipe on a downstream side of the oxygen buffer tank and on an upstream side of a junction of the primary system pipe.

6 Claims, 13 Drawing Sheets

OXYFUEL COMBUSTION BOILER PLANT AND OPERATION METHOD OF OXYFUEL COMBUSTION BOILER PLANT

CLAIM OF PRIORITY

The present application claims priority from Japanese patent application serial No. 2009-225912, filed on Sep. 30, 2009, the content of which is hereby incorporated by reference into this application.

BACKGROUND OF THE INVENTION

1. Field of the Invention

The present invention relates to an oxyfuel combustion boiler plant and an operation method of the oxyfuel combustion boiler plant.

2. Description of Related Art

A boiler for burning pulverized coal can be divided into two kinds of combustion systems depending on the gas to be supplied to a burner. Air-fuel combustion is of a system for burning fuel by supplying air to the burner. Further, oxyfuel combustion is of a system for burning fuel by a mixture of high purity oxygen and combustion exhaust gas instead of air.

In the oxyfuel combustion, the exhaust gas components are mostly carbon dioxide, so when capturing carbon dioxide from exhaust gas, there is no need to concentrate the carbon dioxide. Therefore, the oxyfuel combustion can pressurize and cool the exhaust gas as it is and liquefy and separate the carbon dioxide, so it is one of the valid methods of reducing the discharge rate of carbon dioxide.

In the oxyfuel combustion system, as a method for accelerating ignition of pulverized coal flowing in the vicinity of the burner, a method for injecting oxygen toward a mixture flow of pulverized coal and combustion exhaust gas is proposed (Patent Document 1).

Patent Document 1: Japanese Patent application Laid-open No. Hei 7 (1995)-318016

SUMMARY OF THE INVENTION

However, when injecting oxygen toward the mixture flow of pulverized coal and combustion exhaust gas, there is the possibility that pulverized coal may enter a mass of gas having a high oxygen concentration and abnormal combustion such as a backfire may occur. Particularly, immediately after starting oxygen supply or when changing the operation conditions, abnormal combustion occurs easily.

Therefore, an object of the present invention is to provide an oxyfuel combustion boiler plant or an operation method of the oxyfuel combustion boiler plant that prevents abnormal combustion from occurring in the burner.

The present invention provides an oxyfuel combustion boiler plant comprising: an oxygen buffer tank disposed on a downstream side of the air separation unit; an oxygen supply pipe for supplying oxygen to the primary system pipe of the burner from the oxygen buffer tank; and a nitrogen supply pipe for supplying a part of nitrogen generated from the air separation unit or an air supply pipe for supplying air from outside which is connected to the oxygen supply pipe on a downstream side of the oxygen buffer tank and on an upstream side of a junction of the primary system pipe.

According to the present invention, an oxyfuel combustion boiler plant or an operation method of the oxyfuel combustion boiler plant that prevents abnormal combustion from occurring in the burner can be provided.

DETAILED DESCRIPTION OF THE INVENTION

Hereinafter, a preferred embodiments of oxyfuel combustion boiler plant will be explained with reference to the accompanying drawings.

Embodiment 1

Figure 1:
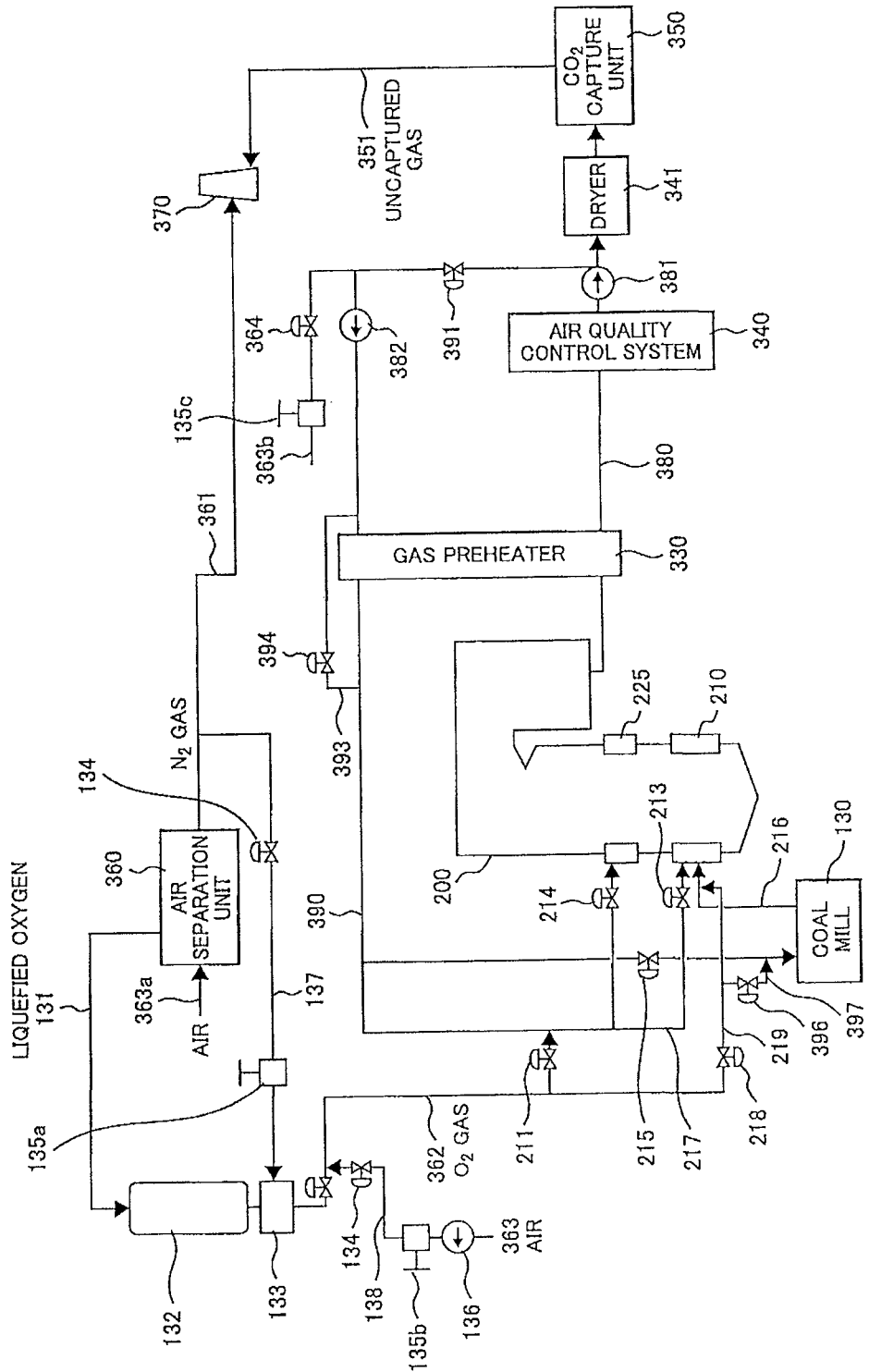
FIG. 1 is a drawing for illustrating the constitution of an oxyfuel combustion boiler plant of the first embodiment.

FIG. 1 shows an oxyfuel combustion boiler plant using coal as fuel. This embodiment is a thermal power plant for generating steam using a boiler 200.

The boiler 200 includes a burner 210 and a gas port 225. The burner 210 supplies and burns pulverized coal to the furnace in the boiler. The gas port 225 is installed on the downstream side of the burner 210 and supplies second stage combustion gas to the furnace.

The system pipes through which combustion exhaust gas discharged from the boiler 200 flows will be explained below. Combustion exhaust gas 380 indicates the system pipe through which the exhaust gas discharged from the boiler 200 flows. An air quality control unit 340 is an apparatus for purifying exhaust gas. A fan 381 is a unit for letting exhaust gas flow. A dryer 341 cools exhaust gas and simultaneously removes hygroscopic moisture. A $CO_2$ capture unit 350 compresses exhaust gas after drying and captures carbon dioxide from the exhaust gas. Uncaptured gas 351 indicates a system line showing gas remaining after carbon dioxide is captured by the $CO_2$ capture unit 350. Circulation exhaust gas 390 indicates a system pipe through which a part of the combustion exhaust gas 380 discharged from the boiler is re-circulated to the boiler 200. A circulation exhaust gas flow rate regulating valve 391 has a function for adjusting the flow rate of circulation exhaust gas. A fan 382 is a unit for pressurizing the circulation exhaust gas so as to re-circulate it to the boiler. A gas preheater 330 permits the combustion exhaust gas 380 and circulation exhaust gas 390 to exchange heat, thereby heating the circulation exhaust gas 390. Low-temperature circulation exhaust gas 393 indicates a system line for bypassing the gas preheater 330. A bypass flow rate control valve 394 has a function for adjusting the flow rate of the circulation exhaust gas 393. Flow rate regulating valves 213 and 214 have functions for adjusting the flow rates of the circulation exhaust gas 390 at which it is supplied respectively to the burner 210 and air port 225. Further, an air pipe 363b for air-fuel combustion supplies external air to the boiler 200 at the time of air-fuel combustion. On the air pipe 363b for air-fuel combustion, a stop valve 135c and an air flow rate regulating valve 364 are installed.

Next, the oxygen supply system will be explained. An air separation unit 360 is an apparatus for separating nitrogen from air 363a and manufacturing oxygen. Liquefied gas 131 is manufactured by the air separation unit 360. An oxygen buffer tank 132 is a tank for storing the liquefied gas 131. A carburetor 133 vaporizes the liquefied gas 131 and generates oxygen gas 362. A first oxygen supply pipe 219 is a pipe for letting the oxygen gas 362 pass through. On the first oxygen supply pipe 219, a flow rate regulating valve 218 for adjusting the flow rate of oxygen supplied to a primary system pipe 216 is provided. Further, a flow rate regulating valve 211 is a valve for adjusting the flow rate of oxygen supplied to the circulation exhaust gas. And, a second oxygen supply pipe 397 is a pipe for supplying oxygen to the circulation exhaust gas on the upstream side of a coal mill 130. Also on the second oxygen supply pipe 397, a flow rate regulating valve 396 is installed.

Next, the nitrogen supply system will be explained. Nitrogen gas 361 is discharged to a chimney 370. A nitrogen supply pipe 137 is a pipe for supplying a part of nitrogen gas separated by the air separation unit 360 to the first oxygen supply pipe 219. On the nitrogen supply pipe 137, a flow rate regulating valve 134 and a stop valve 135a are installed.

Further, to the first oxygen supply pipe 219, an air supply pipe 138 is connected. The air supply pipe 138 includes a gas supply unit 136 for pressurizing and supplying air 363, a stop valve 135b, and the flow rate regulating valve 134.

Also, the coal mill 130 pulverizes coal and generates pulverized coal. A primary system pipe 216 of the burner 210 supplies the pulverized coal from the coal mill 130 to the burner 210 together with circulation exhaust gas. The system for supplying the circulation exhaust gas 390 to the coal mill 130 includes a flow rate regulating valve 215. Further, the pipe for supplying the circulation exhaust gas 390 directly to the burner 210 is assumed as a secondary system pipe 217.

The system of the combustion exhaust gas 380 discharged from the boiler includes the gas preheater 330, the air quality control unit for purifying exhaust gas 340, the fan 381 for letting gas flow, the carbon dioxide capture unit 350 for cooling, liquefying, and capturing carbon dioxide in the exhaust gas, and the chimney 370 for discharging the uncaptured gas 351 composed of mainly nitrogen and oxygen remaining after capture of carbon dioxide.

As shown in FIG. 1, the boiler plant of this embodiment includes the air separation unit 360 for dividing air into gas mainly composed of nitrogen and gas mainly composed of oxygen and manufacturing high purity oxygen. The air separation unit 360 is a system for separating oxygen and nitrogen using a difference in the boiling points between them and cools air, thereby manufacturing oxygen. This embodiment does not depend upon the air separation method but other methods such as a film separation system for separating air using a difference in the size between nitrogen molecules and oxygen molecules.

The air separation unit 360 separates the air 363a to the high purity liquefied oxygen 131 and nitrogen gas 361 mainly composed of nitrogen. The separated nitrogen gas 361 is discharged into the air from the chimney 370.

If fuel is burnt using high purity oxygen instead of air, the flame temperature becomes excessively high, thus there is the possibility that the burner for burning fuel and the wall surface of the boiler may be damaged. Therefore, high purity oxygen gas manufactured by the air separation unit 360 is mixed with the circulation exhaust gas 390 which is a part of exhaust gas discharged from the boiler and is supplied to the burner 210 and two-stage combustion gas port 225. The circulation exhaust gas 390 is raised in temperature by the gas preheater 330. A part of the circulation exhaust gas 390 is permitted to bypass without passing through the gas preheater 330 and the low-temperature circulation exhaust gas 393 is mixed with the circulation exhaust gas, thus adjusting the temperature. The flow rate of the low-temperature circulation exhaust gas 393 is adjusted by the bypass flow rate control valve 394.

The circulation exhaust gas 390 is a part of the gas after being purified by the air quality control unit 340 and is raised in temperature by the gas preheater 330. The flow rate of the circulation exhaust gas 390 can be adjusted by the opening of the circulation exhaust gas flow rate regulating valve 391.

The flow rate of the oxygen gas 362 supplied to the burner 210 and gas port 225 can be adjusted by adjusting the openings of the flow rate regulating valves 211, 213, and 214. Further, the flow rate of the circulation exhaust gas 390 can be similarly adjusted by controlling the openings of the flow rate regulating valves 213 and 214.

Coal which is fuel is pulverized to pulverized coal by the coal mill 130, passes through the primary system pipe 216 together with a part of the circulation exhaust gas 390 passing through the flow rate regulating valve 215, and then is conveyed to the burner 210. The burner 210 mixes and burns secondary system gas having a high oxygen concentration flowing through the secondary system pipe 217 and primary system gas composed of pulverized coal and circulation exhaust gas which flow through the primary system pipe 216, thereby generating high-temperature combustion gas in the furnace of the boiler 200.

Here, the oxygen concentration in the primary system gas is several %, so a problem arises that pulverized coal hardly ignites in the vicinity of the burner. Therefore, if the oxygen gas 362 is supplied to the primary system pipe 216, the oxygen concentration of the primary system gas increases and the ignition property of pulverized coal is improved. However, immediately after oxygen is supplied to the primary system pipe 216, a mass of gas having a high oxygen concentration close to pure oxygen is formed inside the primary system pipe 216. If pulverized coal particles enter the mass of gas, the pulverized coal is oxidized under the condition of an extremely high oxygen concentration and there is the possibility that abnormal combustion such as a backfire may occur. If abnormal combustion occurs, an extremely high-temperature flame is formed and the burner and the pipe connected to the burner may be molten. Therefore, to improve the reliability of the oxyfuel combustion boiler plant, a countermeasure for preventing the occurrence of abnormal combustion is necessary.

Furthermore, the second oxygen supply pipe 397 supplies the oxygen gas 362 to the upstream side pipe for supplying circulation exhaust gas to the coal mill 130. The oxygen concentration of circulation exhaust gas flowing into the coal mill 130 is slightly increased beforehand, thus the pulverized coal ignition property in the vicinity of the burner can be improved more.

The constitution of the vicinity of the air separation unit 360 will be explained below in more detail.

The air separation unit 360 separates the air 363a to high purity oxygen and a component mainly composed of nitrogen and the separated component mainly composed of nitrogen is discharged into the air from the chimney 370 as the nitrogen gas 361. The oxygen concentration of the high purity oxygen is a volume concentration of about 97%. The remaining gas component of 3% is mostly nitrogen. If the nitrogen concentration is excessively high, the carbon dioxide capture efficiency after combustion is lowered. If the purity of oxygen is made excessively high, the cost of the plant is increased. Generally, high purity oxygen is generated in a form of the liquefied oxygen 131. The liquefied oxygen 131 is stored once in the oxygen buffer tank 132. By doing this, the start of the plant and the switching from the air-fuel combustion to the oxyfuel combustion can be executed easily. The oxygen buffer tank 132 supplies the oxygen stored once to the carburetor 133 and the carburetor 133 vaporizes the liquefied oxygen 131 to the oxygen gas 362 and then supplies it to the boiler 200. A part of the nitrogen gas 361 flows through the nitrogen supply pipe 137. The flow rate regulating valve 134 controls the flow rate of the nitrogen gas 361 and then the nitrogen gas 361 joins the oxygen gas 362. By doing this, the oxygen purity in the oxygen gas 362 is lowered (the oxygen concentration is lowered). If this operation is executed, in the burner inside the boiler, abnormal combustion such as a backfire hardly occurs.

Further, the operation of supplying the nitrogen gas 361 to the first oxygen supply pipe 219 is executed only when changing the operation state of the plant such as switching from the air-fuel combustion to the oxyfuel combustion. In the other cases, the nitrogen gas 361 is not supplied to the first oxygen supply pipe 219. If nitrogen is always supplied, the nitrogen concentration in the oxygen gas 362 is increased excessively and the carbon dioxide capture efficiency after combustion is lowered. Further, to stop the supply of nitrogen, the stop valve 135a is installed on the nitrogen supply pipe 137. The device for controlling the flow rate cannot completely stop the supply of gas. Therefore, a stop valve 135 for taking charge of only opening and closing the flow path is necessary.

In FIG. 1, the vaporized nitrogen joins the vaporized oxygen, though liquefied nitrogen may be joined with liquefied oxygen. In this case, the liquefied nitrogen is joined with the liquefied oxygen on the downstream side of the oxygen buffer tank 132. If the liquefied nitrogen is joined to the liquefied oxygen in the oxygen buffer tank 132 or on the upstream side thereof, the purity of oxygen is always lowered, so the carbon dioxide capture efficiency after combustion is lowered.

The aforementioned operation of supplying the nitrogen gas 361 to the first oxygen supply pipe 219, when changing the operation state of the plant, is executed to lower the oxygen concentration in the oxygen gas 362. Further, to lower the oxygen concentration in the oxygen gas 362, another method may be used. In FIG. 1, the method for supplying air to the first oxygen supply pipe 219 is also shown. The gas supply unit 136 leads air to the air supply pipe 138 and the flow rate regulating valve 134 controls the air flow rate and supplies air to the first oxygen supply pipe 219. After completely shifting to the oxyfuel combustion, the air supply from the air supply pipe 138 must be stopped. For that purpose, the stop valve 135 is installed on the air supply pipe 138.

As mentioned above, to the oxygen supply pipe 219 on the downstream side of the oxygen buffer tank 132 and on the upstream side of the junction of the primary system pipe 216 to the oxygen supply pipe 219, the nitrogen supply pipe for supplying a part of nitrogen 137 generated from the air separation unit 360 or the air supply pipe for supplying air 138 from the outside is connected, thus an operation of lowering the oxygen concentration of oxygen gas flowing through the oxygen supply pipe 219 can be performed. Therefore, an oxyfuel combustion boiler plant that prevents abnormal combustion from occurring in the burner can be provided.

Next, the operation method of the oxyfuel combustion boiler plant will be explained.

Figure 2:
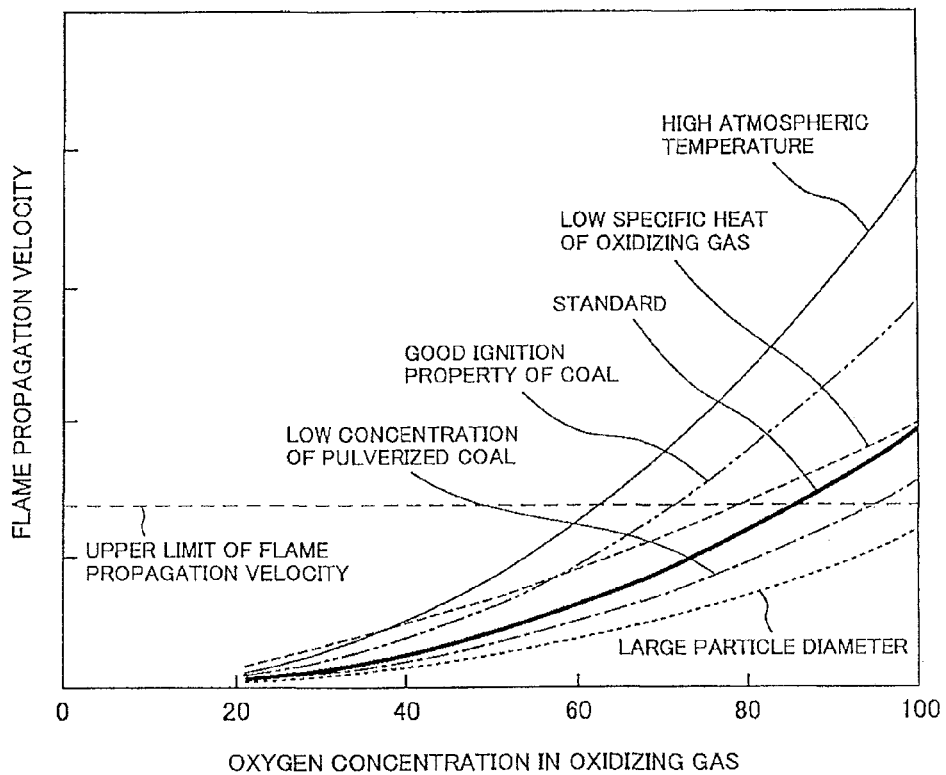
FIG. 2 is a drawing for illustrating the relation between the oxygen concentration in the oxidizing gas and the flame propagation velocity of pulverized coal under various atmospheric conditions.

The possibility of an occurrence of abnormal combustion such as a backfire is strongly related to the flame propagation velocity. FIG. 2 shows the experimental data indicating the relation between the oxygen concentration in the oxidizing gas and the flame propagation velocity of pulverized coal under various combustion conditions. The oxidizing gas is gas to be supplied to the primary system pipe and secondary system pipe of the burner. The flame propagation velocity strongly depends upon the oxygen concentration in the oxidizing gas. Further, the flame propagation velocity varies with various conditions in addition to the oxygen concentration. For example, the flame propagation velocity varies with the factors of the atmospheric temperature, specific heat of the oxidizing gas, property of coal, and particle diameter and concentration of pulverized coal.

Also, if the flame propagation velocity is extremely high, abnormal combustion such as a backfire occurs easily. The maximum flame propagation velocity depends upon the design conditions of the plant. Therefore, so as to control the flame propagation velocity to the design conditions or lower, the combustion conditions must be adjusted. However, if the flame propagation velocity is extremely low, the flame disappears. Therefore, the flame propagation velocity has an optimum value.

The burner at the time of oxyfuel combustion can change the oxygen concentration. Therefore, a method for adjusting to an optimum flame propagation velocity is to adjust the oxygen concentration. At the time of the stationary operation of oxyfuel combustion, the atmospheric temperature, specific heat of the oxidizing gas, property of coal, and particle diameter and concentration of pulverized coal are decided to a certain extent, so an optimum oxygen concentration is easily decided. Under the control of the oxygen supply rate, the combustion state is easily controlled.

However, when the operation condition is changed such as switching from the air-fuel combustion to the oxyfuel combustion, the atmospheric temperature, specific heat of the oxidizing gas, property of coal, and particle diameter and concentration of pulverized coal are changed variously. In this case, it is difficult to decide an optimum oxygen concentration condition. And, the abnormal combustion phenomenon occurs if there is a time zone that the flame propagation velocity exceeds its upper limit even in a moment and burnout of the combustor may be caused. Therefore, a countermeasure for removing the possibility that the flame propagation velocity may exceed the upper limit value is necessary.

The countermeasure is to reduce the oxygen concentration under any atmospheric condition. The countermeasure is effective in the reduction in the flame propagation velocity. For example, from the beginning of switching the operation state from the air-fuel combustion to the oxyfuel combustion, the oxygen concentration of the oxygen gas flowing through the first oxygen supply pipe 219 is reduced. If the oxygen separation unit 360 supplies oxygen gas with an oxygen purity of 97%, there is a case that pulverized coal is burnt under the atmospheric condition of oxygen 97% and the flame propagation velocity at this time is very high. On the other hand, when the oxygen concentration of oxygen gas flowing through the first oxygen supply pipe 219 is reduced to, for example, 70 to 80%, there are no possibilities that pulverized coal may burn. From the results shown in FIG. 2, if the oxygen concentration of the oxidizing gas is reduced from 97% of oxygen to about 70 to 80% of oxygen, the flame propagation velocity is reduced to close to ½. Therefore, even by a small reduction in the oxygen concentration, the suppression efficiency of abnormal combustion is large.

Figure 3:
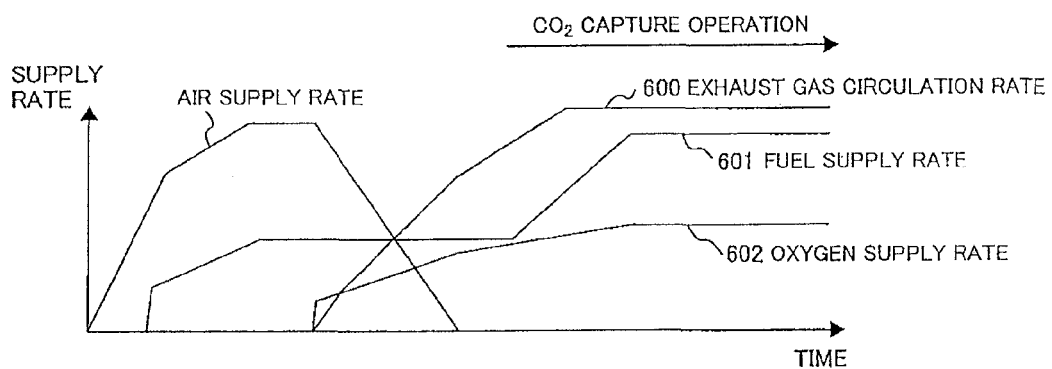
FIG. 3 is a drawing for illustrating the situation of changes of the fuel supply rate, air supply rate, oxygen supply rate, and recirculation rate of combustion exhaust gas until the plant starts in the air-fuel combustion, then switches to the oxyfuel combustion, and reaches the stationary operation of capturing carbon dioxide.

Next, FIG. 3 shows the situation of changes of the fuel supply rate, air supply rate, oxygen supply rate, and exhaust gas circulation rate until the plant starts in the air-fuel combustion, then is switched to the oxyfuel combustion, and reaches the stationary operation state of the oxyfuel combustion.

At the start time, air is supplied from the air pipe for air-fuel combustion 363b. At the point in time when the air flow rate reaches a predetermined value, fuel is supplied and ignited. Thereafter, the air supply rate and fuel supply rate are increased gradually and the load is increased. At the point in time when the load of switching from the air-fuel combustion to the oxyfuel combustion is obtained, the air supply rate from the air pipe for air-fuel combustion 363b is reduced gradually. At the same time, the recirculation of exhaust gas is started and the exhaust gas supply rate to be recirculated is increased gradually. In correspondence with the start of the exhaust gas recirculation, the oxygen supply is started. In correspondence with the increase in the exhaust gas circulation rate and the reduction in the air supply rate, the oxygen supply rate is increased. At the point in time when the air supply is stopped, the oxyfuel combustion is switched to. At this point in time, the carbon dioxide capture operation is started. Thereafter, the exhaust gas circulation rate, oxygen supply rate, and fuel supply rate are increased and the necessary conditions are realized.

The air supply rate, fuel supply rate, exhaust gas circulation rate, and oxygen supply rate at the time of operation are decided beforehand as an operation plan, though the actual supply rates are slightly shifted from the plan. The shifts are caused by errors in the measuring instruments for measuring the supply rates of gas and fuel and the controller. When there are large shifts between the actual supply rates and the planned values, abnormal combustion occurs easily. And, the shifts are caused when the operation state is changed such as switching from the air-fuel combustion to the oxyfuel combustion. For example, when switching from the air-fuel combustion to the oxyfuel combustion, the oxygen supply is started. To supply oxygen as planned and accurately, the flow rate controller must be operated accurately, though the controller always has an error. From the nature of the controller, the controller easily causes an error when the flow rate is low. Therefore, when the oxygen supply rate immediately after start of the oxygen supply is low, an error is easily caused. Further, it is desirable that oxygen is supplied as slowly as possible, though immediately after supply start, a fixed quantity is easily supplied instantaneously. Further, the flow rate controller is always subject to a response delay. Therefore, when changing the oxygen supply rate, it is difficult to always adjust the supply rate accurately. Therefore, even when the operation state is changed and the oxygen supply rate is shifted from the plan to a certain extent, a plan for the controller to prevent abnormal combustion from occurring is necessary.

Figure 4:
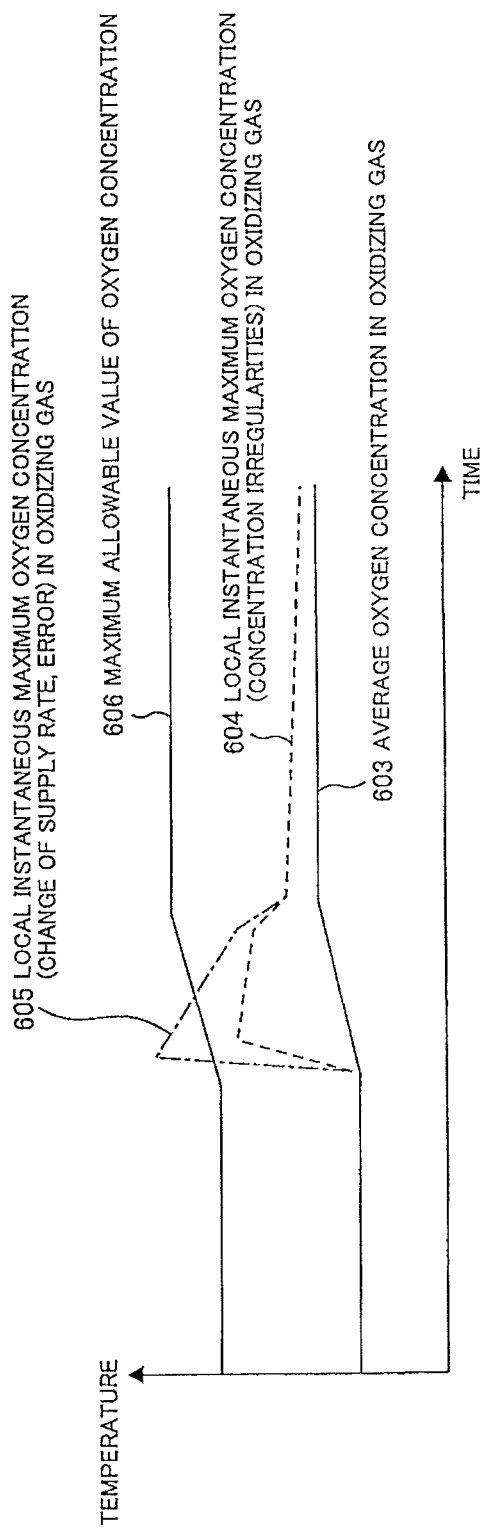
FIG. 4 is a comparison example, when the plant is operated according to the plan shown in FIG. 3, showing the situation of changes of the oxygen concentration in the oxidizing gas.

FIG. 4 shows an example (a comparison example), when the plant is operated according to the plan shown in FIG. 3, indicating the situation of changes of the oxygen concentration in the oxidizing gas. This comparison example shows the case that from the nitrogen supply pipe 137 or the air supply pipe 138 connected to the primary system pipe 216, nitrogen or air is not supplied. Here, with respect to the oxygen concentration in the oxidizing gas, the average concentration and local and instantaneous concentration must be considered. If the average oxygen concentration is extremely low, non-ignition may be caused. A curve 603 shown in FIG. 4 shows an average oxygen concentration. If the main component of the oxidizing gas is changed from nitrogen to carbon dioxide, at the same oxygen concentration, the flame propagation velocity is decreased. Therefore, when it is switched to the oxyfuel combustion, it is desirable to increase the average oxygen concentration to a certain extent.

If the local and instantaneous oxygen concentration is extremely high, abnormal combustion such as a backfire is caused. When oxygen is supplied to the primary system pipe 216 through which a mixture of combustion exhaust gas and pulverized coal flows, concentration irregularities are caused in the inner space of the primary system pipe 216 and a region of a locally high oxygen concentration and a region of a locally low oxygen concentration are formed. A curve 604, in consideration of the concentration irregularities, shows the situation of changes of the oxygen concentration in the region of a locally highest oxygen concentration. Inside the primary system pipe 216, the mixing property of oxygen gas and combustion exhaust gas varies with the conditions such as the gas flow rate. Therefore, when changing the gas flow rate, it is difficult to always keep a good mixing property and when changing the flow rate, there is a case that a local oxygen concentration is increased temporarily.

A curve 606 shows the upper limit value of the oxygen concentration allowable to prevent abnormal combustion. The oxygen concentration of the oxidizing gas must always be lower than the upper limit value of the oxygen concentration. The oxygen concentration of the curve 604 is lower than the upper limit value. However, when switching from the air-fuel combustion to the oxyfuel combustion, the allowance up to the upper limit value is reduced. And, when there is a change with time in the gas flow rate, the oxygen concentration may be increased more instantaneously. A curve 605 shows an instantaneous highest oxygen concentration in consideration of the change of the gas flow rate. As shown in FIG.

4, when the instantaneous highest oxygen concentration 605 exceeds the allowable value 606, abnormal combustion occurs easily. When the comparison example is used, there are possibilities that the instantaneous highest oxygen concentration may reach about 97%. The occurrence condition of abnormal combustion is that in addition to a high oxygen concentration, a condition that a large volume of pulverized coal enters the region of high oxygen concentration is complete. In this embodiment, the advice for preventing the oxygen concentration from exceeding the allowable value is made.

Figure 5:
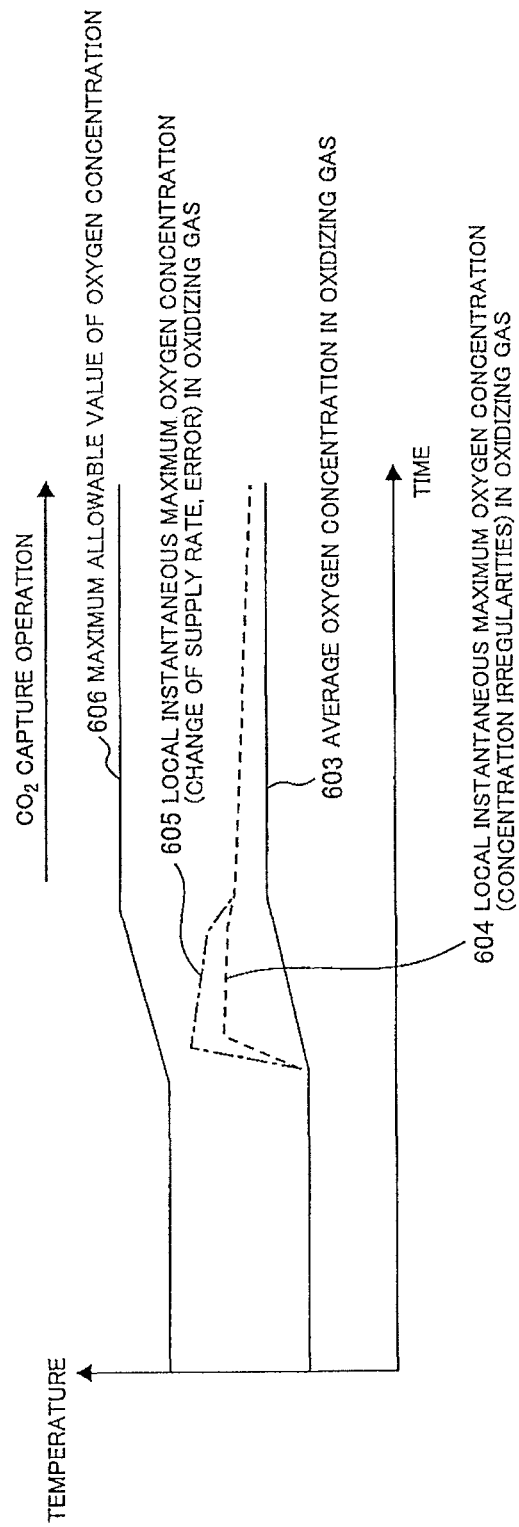
FIG. 5 is a drawing showing an example of the situation of changes of the oxygen concentration in the oxidizing gas, when the plant is operated in the first embodiment.

FIG. 5, when the plant is operated by applying this embodiment according to the plan shown in FIG. 3, shows the situation of changes of the oxygen concentration. If nitrogen gas or air is mixed beforehand in the oxygen gas 362 and the oxygen concentration in the oxygen gas 362 is reduced, the instantaneous highest oxygen concentration can be reduced. For example, if the oxygen concentration in the oxygen gas 362 is reduced by 20%, it can be expected that the instantaneous highest oxygen concentration is also reduced by 20%. Under the condition that the control for the gas flow rate is most difficult, the oxygen concentration in the oxygen gas 362 may be reduced to the allowable value or smaller. By this operation, the possibility that the instantaneous highest oxygen concentration may exceed the allowable value is eliminated.

Figure 6:
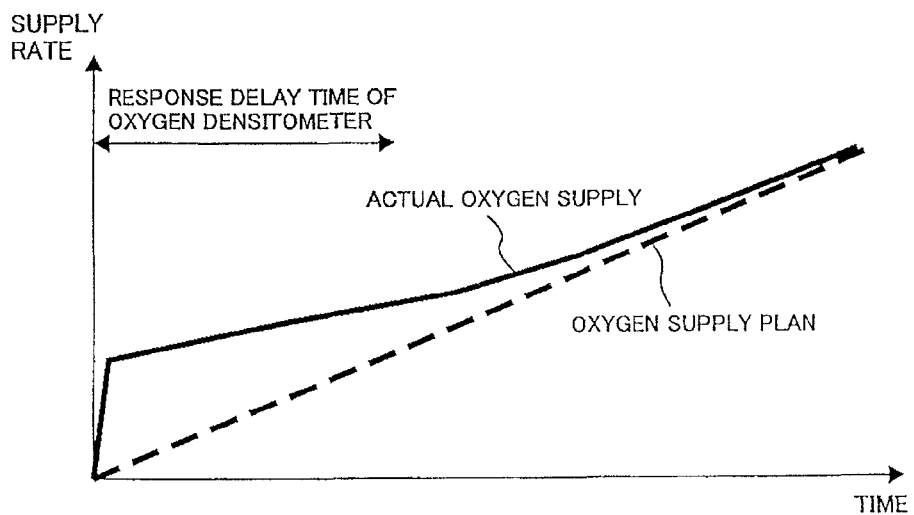
FIG. 6 is a drawing showing an example of the shifts between the planed supply rate and the actual supply rate when oxygen is supplied of the first embodiment.

FIG. 6 shows a change with time of the oxygen supply rate. It is an example showing shifts between the planned value and the actual supply rate. Immediately after start of the oxygen supply, the planned value and actual flow rate are easily shifted from each other. Inversely to FIG. 6, the actual supply rate may be lower than the planned value. However, it is difficult to artificially control whether to make the supply rate higher or lower than the planned value. As shown in FIG. 6, when the actual supply rate is higher than the planned value, abnormal combustion occurs easily. In the reverse case, non-ignition occurs easily. Further, if the oxygen concentration of the oxidizing gas is measured and the oxygen supply rate is corrected on the basis of the measurement results, the error in the oxygen supply rate can be reduced. However, the measuring instrument is accompanied with a response delay. Therefore, before a given period of time elapses after the oxygen supply is started, the control method using this measuring instrument cannot be used. If a certain period of time elapses and the oxygen supply rate is increased, the error of the oxygen supply rate is reduced and the control method using the measuring instrument can be used.

Figure 7:
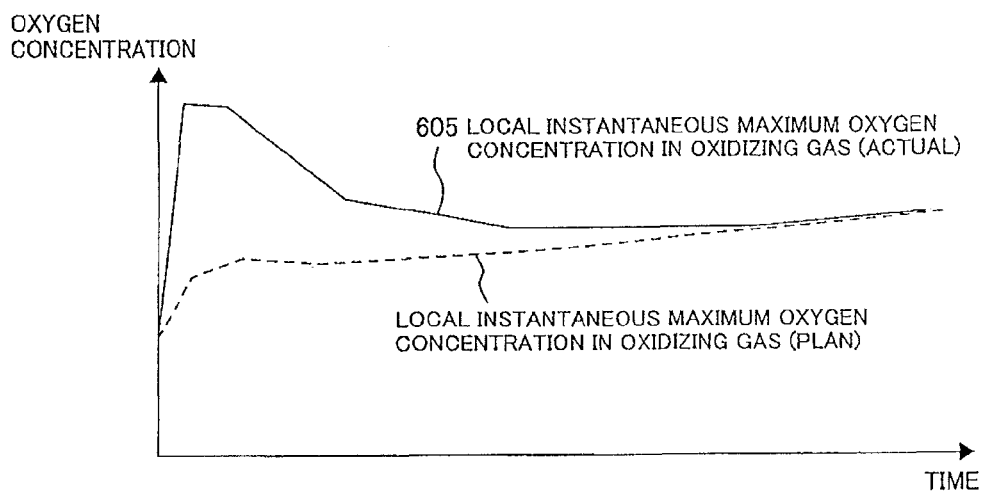
FIG. 7 is a drawing showing changes of the maximum values of the local instantaneous oxygen concentration in the oxidizing gas when the plant is operated according to FIG. 6 in the first embodiment.

FIG. 7, when the plant is operated as shown in FIG. 6, shows the situation of changes of the instantaneous maximum value of the oxygen concentration. At the initial stage before a given period of time elapses after the oxygen supply is started, the oxygen concentration increases easily. Further, at this initial stage, the concentration is difficult to confirm by measurement.

Figure 8:
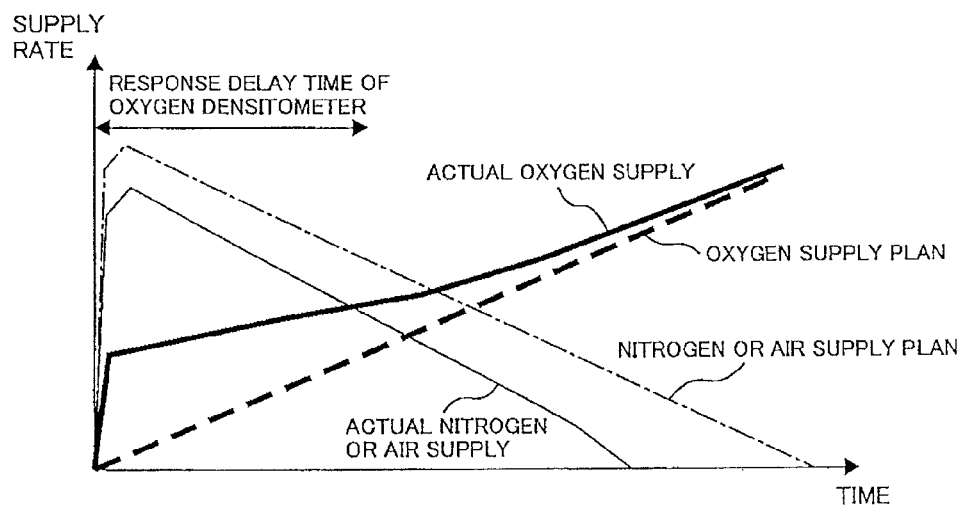
FIG. 8 is a drawing showing an example of the shifts between the planed supply rate and the actual supply rate when oxygen and nitrogen or air are supplied in the first embodiment.

FIG. 8 shows the situation of changes of the supply rate of the oxygen gas 362 and nitrogen gas (or air) when this embodiment is applied. The nitrogen gas or air is supplied slightly earlier than the oxygen supply. Therefore, at the point in time when the oxygen supply is started, the possibility that high purity oxygen may make contact with a mixture of pulverized coal and combustion exhaust gas which flow through the primary system pipe 216 is eliminated. Immediately after start of the oxygen supply, an error is caused easily in the oxygen supply rate, so the supply rate of nitrogen or air is increased. By doing this, the oxygen concentration of the oxygen gas 362 is reduced, so even if a large supply rate change or large concentration irregularities are caused, the instantaneous maximum value of the oxygen concentration is hardly increased. According to the increase in the oxygen supply rate, the supply rate of nitrogen or air is reduced. If the supply rate of nitrogen or air is reduced, the errors in the nitrogen and oxygen supply rates are increased. However, at this point in time, the error in the oxygen supply rate is reduced, so the instantaneous maximum value of the oxygen concentration is hardly increased. Further, on the basis of the measured value of the oxygen concentration, the supply rate can be corrected. At the point in time when it is completely switched to the oxyfuel combustion, the supply of nitrogen or air is stopped. By doing this, at the time of oxyfuel combustion, high purity oxygen is supplied, so the carbon dioxide capture efficiency in exhaust gas is not reduced.

Figure 9:
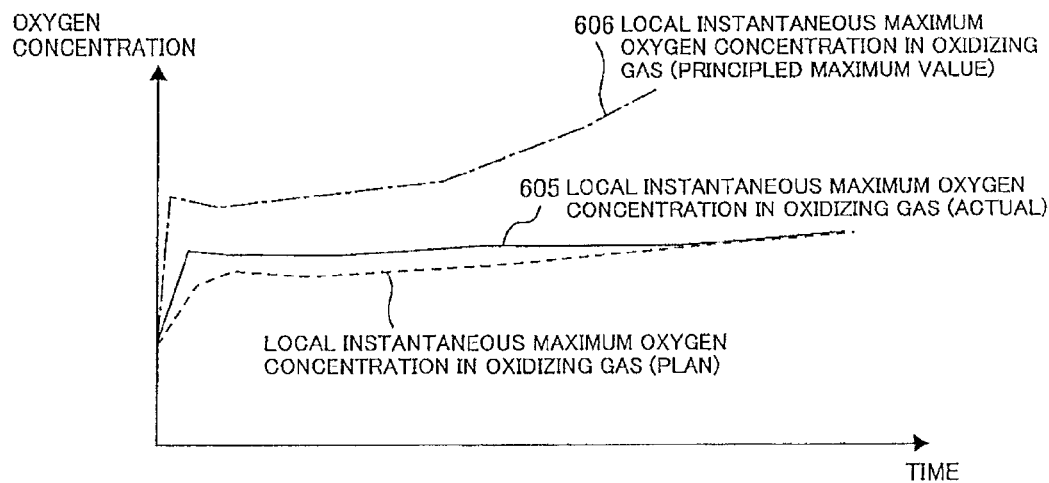
FIG. 9 is a drawing showing changes of the maximum values of the local instantaneous oxygen concentration in the oxidizing gas when the plant is operated according to FIG. 8 in the first embodiment.

In the operation state shown in FIG. 8, the situation of changes of the instantaneous maximum value of oxygen concentration is shown in FIG. 9. At the initial stage of start of the oxygen supply, the oxygen concentration is reduced. At the initial stage, in the instantaneous maximum value of oxygen concentration, there exists a principal maximum concentration. Therefore, at the initial stage that the adjustment of the supply rate is difficult, the oxygen concentration can be prevented from increasing.

Here, "the principal maximum value of oxygen concentration" will be explained. For example, when mixing circulation exhaust gas of an oxygen concentration of 10% with oxygen gas of an oxygen concentration of 70%, the oxygen concentration of the mixed gas becomes smaller than 70%. At this time, "an oxygen concentration of 70%" is a principal maximum value. As mentioned above, in this embodiment, a principal maximum value is provided in the oxygen concentration, thus even if the operation condition is changed, abnormal combustion can be prevented.

As mentioned above, supplying air from the air pipe for air-fuel combustion 363b to the exhaust gas recirculation system pipe 390 in an operation state of air-fuel combustion, stopping the air supply from the air pipe for air-fuel combustion 363b and supplying and burning the oxygen and the combustion exhaust gas to the boiler 200 when shifting from the operation state of air-fuel combustion to the operation state of oxyfuel combustion, and supplying nitrogen or air to the oxygen supply pipe 219 from the nitrogen supply pipe 137 or the air supply pipe 138 which is connected to the oxygen supply pipe 219, thus an operation method of an oxyfuel combustion boiler plant to prevent abnormal combustion from occurring in the burner can be provided.

Further, as a method for preventing abnormal combustion, when starting the oxygen supply, a method for making the particle diameter of pulverized coal larger for supplying may be considered. As shown in FIG. 2, if the particle diameter is made larger, the flame propagation velocity is decreased. Further, if the particle diameter is made larger, the maximum oxygen concentration allowable value 606 shown in FIG. 5 is increased, so the allowance up to the allowable value is increased and abnormal combustion can be prevented. To make the particle diameter larger, the operation state of the coal mill 130 shown in FIG. 1 may be changed. Generally, the coal mill 130 is equipped with a classifier in the vicinity of the exit thereof. The classifier captures particles larger than a certain fixed diameter and returns them to the coal mill to repulverize. Therefore, to make the particle diameter larger for supplying, a method for making the separation particle diameter of the classifier larger may be considered.

Embodiment 2

Figure 10:
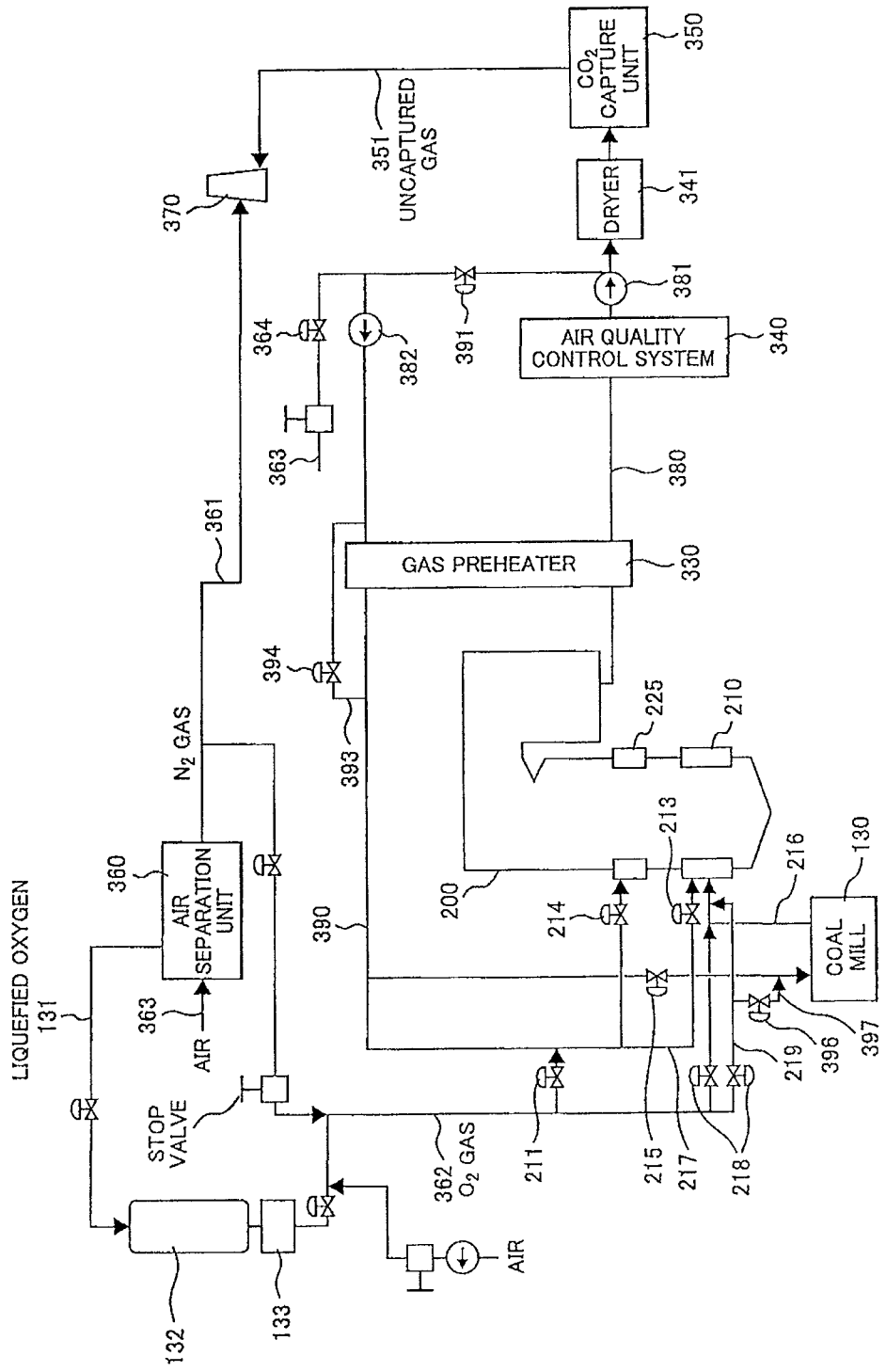
FIG. 10 is a drawing for illustrating the constitution of an oxyfuel combustion boiler plant of the second embodiment.

FIG. 10 shows a modification of the supply method of the oxygen gas 362. The difference from FIG. 1 is that the oxygen gas 362 is supplied to the primary system pipe 216 in two stages instead of one. By doing this, the occurrence of abnormal combustion can be suppressed furthermore.

Figure 11:
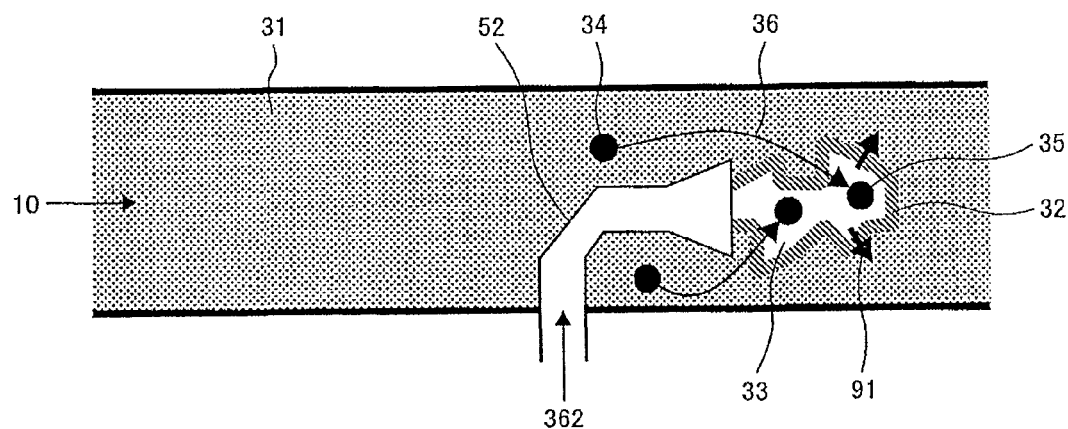
FIG. 11 is a drawing showing the mixing state of gas and pulverized coal in the second embodiment.

An example of the mixing state of gas and pulverized coal when the oxygen gas 362 is supplied to a flow 31 of the primary system gas is shown in FIG. 11. FIG. 11 shows the mixing state when the oxygen gas 362 is supplied at one time.

The oxygen gas 362 is injected from the oxygen supply nozzle 52 toward the flow 31 of the primary system gas. On the boundary between the oxygen gas 362 and the flow 31 of the primary system gas, a mixing region 32 is formed. However, the injected gas is not all mixed instantaneously. Therefore, inside the mixing region 32, a mass of gas of a high oxygen concentration 33 is formed temporarily. The flow 31 of the primary system gas is accompanied with pulverized coal particles 34. The pulverized coal particles 34 will not move in complete correspondence with the flow 31 of the primary system gas. A part of the pulverized coal particles 34 is shifted from the flow 31 of the primary system gas and moves independently. As a result, for example, via a locus 36 of pulverized coal particles as shown in FIG. 11, the pulverized coal particles 34 may enter the mass of gas of a high oxygen concentration 33. The pulverized coal particles 35 entered in the mass of gas of a high oxygen concentration burn easily. If the pulverized coal particles 35 entered in the mass of gas of a high oxygen concentration are burnt and raised in temperature, the surrounding gas and pulverized coal are heated. And, the fire spreads easily to pulverized coal existing in the mixing region 32 or the flow 31 of the primary system gas.

To prevent the spreading of the fire, there are two valid countermeasures. The first one is to reduce the oxygen concentration in the mass of gas of a high oxygen concentration 33 and make the pulverized coal particles 35 entering the mass of gas of a high oxygen concentration hard to burn. This is the countermeasure indicated in Embodiment 1. The second one, even if the pulverized coal particles 35 entering the mass of gas of a high oxygen concentration are burnt, is to immediately lower the combustion temperature, thereby making the surrounding gas and pulverized coal difficult to heat. To make the surrounding gas and pulverized coal difficult to heat, the volume of the mass of gas of a high oxygen concentration 33 is made as small as possible and the quantity of pulverized coal particles entering the mass of gas 33 are reduced. For example, even if pulverized coal enters a mass of gas of pure oxygen and burns, if the number of entering particles is one, there are few possibilities of spreading of the fire to the surroundings. If the volume of the mass of gas of a high oxygen concentration 33 is small like this, the number of particles entering the mass of gas 33 is reduced and even if the pulverized coal is burnt, the amount of heat due to the combustion can be reduced.

When the volume of the mass of gas 33 is small, the generated combustion heat is soon lost to the surroundings in the direction of an arrow 91, so the temperature does not raise so much. In this case, even if pulverized coal is burnt once, the fire hardly spreads to the surroundings. On the other hand, when the volume of the mass of gas 33 is large, the fire easily spreads to the surroundings. The combustion heat of the pulverized coal entering the mass of gas 33 is high, so the heat is hardly lost to the surroundings and the temperature rises easily. As a result, the surrounding gas and pulverized coal are easily overheated and the fire spreads easily.

Figure 12:
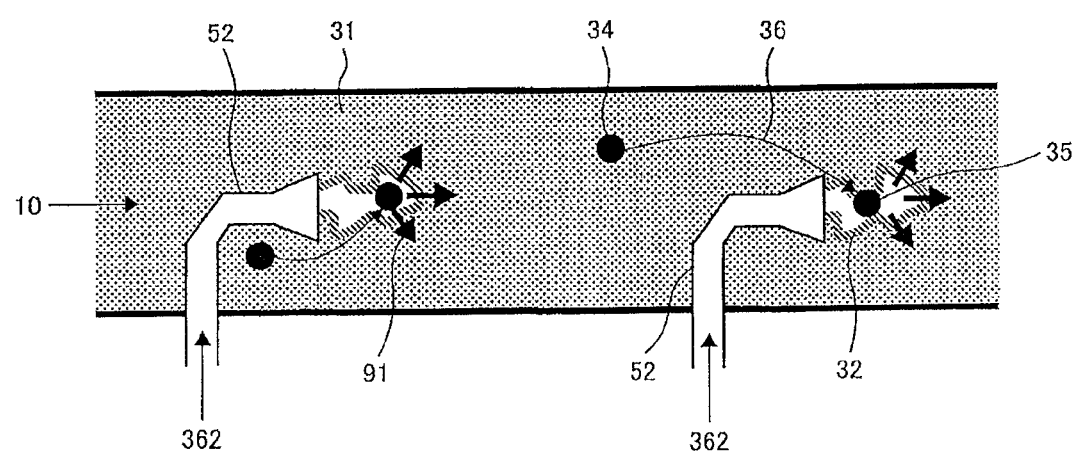
FIG. 12 is a drawing showing the mixing state of gas and pulverized coal when the oxygen gas is supplied like stepwise in the second embodiment.

A method for making the volume of the mass of gas of a high oxygen concentration 33 smaller is preferably a method for dividing and installing the exit of the first oxygen supply pipe 219 in the gas flow direction of the primary system pipe 216, thereby dividing and supplying oxygen stepwise in the flow direction of the primary system gas. FIG. 12 shows an example of the constitution of supplying the oxygen gas 362 stepwise. The flow rate of the oxygen gas 362 supplied from the oxygen supply nozzle 52 (one) is reduced, thus the volume of the mass of gas of a high oxygen concentration 33 is made smaller. Since the volume of the mass of gas 33 is made smaller, even if pulverized coal in the mass of gas is burnt, the fire is hardly spread to the surroundings. Further, in FIG. 12, two masses of gas of a high oxygen concentration 33 are formed. Further, the oxygen supply nozzles 52 are installed away from each other to a certain extent, thus the mutual action of the masses of gas must be prevented. For that purpose, after the oxygen gas 362 supplied on the upstream side is mixed with primary system gas 10 and the mass of gas of a high oxygen concentration 33 disappears, so as to newly supply the oxygen gas 362 on the downstream side, the exits of the oxygen supply pipes are desirably installed away from each other.

Embodiment 3

Figure 13:
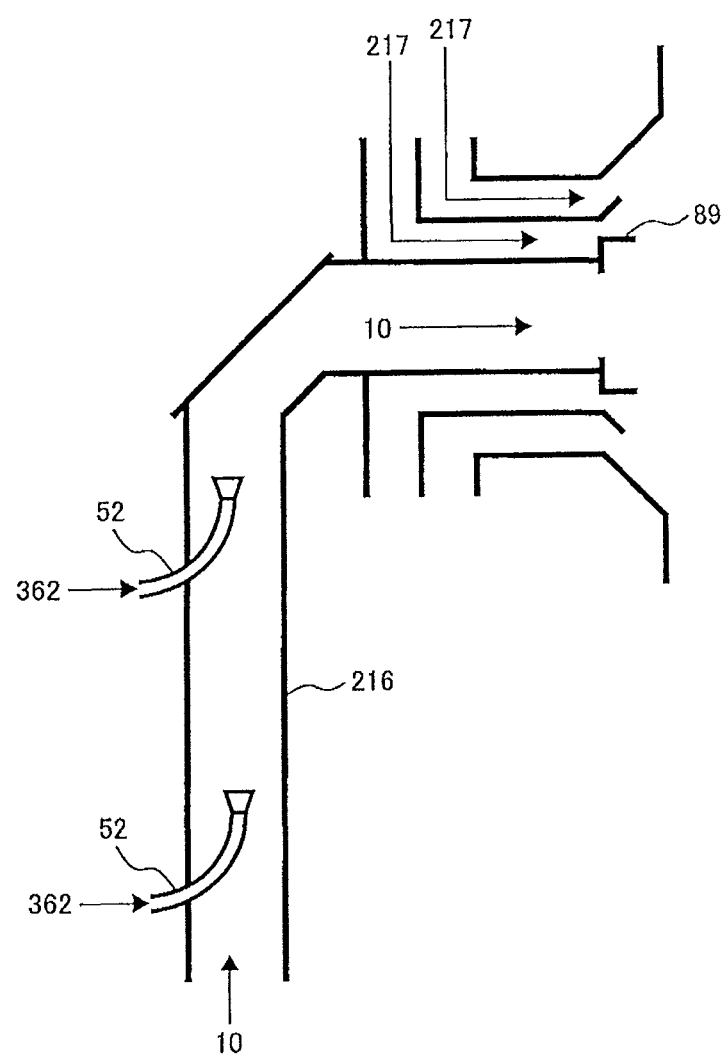
FIG. 13 is a drawing for illustrating the constitution of the vicinity of the burner relating to the third embodiment.

FIG. 13 shows the burner structure and an example of the supply method of the oxygen gas 362. The primary gas 10 is injected from the central part of the burner into the boiler furnace. A flame stabilizer 89 accelerates the ignition of pulverized coal. Secondary system gas 217 is supplied from the circumference of the primary system gas 10. The burner divides the secondary system gas 217 into two flow paths.

The oxygen supply nozzle 52 is installed inside the primary system pipe 216 on the upstream side of the burner. The oxygen supply nozzle 52 is divided into two parts in the flow direction of the primary system gas 10. This method has an advantage in that the primary system gas in the boiler furnace or in the primary system gas immediately after oxygen gas is injected, oxygen concentration irregularities are hardly produced. If the oxygen concentration irregularities are small, there is an advantage that the combustion properties such as the NOx discharge characteristic and lowest load property can be easily predicted.

Embodiment 4

Figure 14:
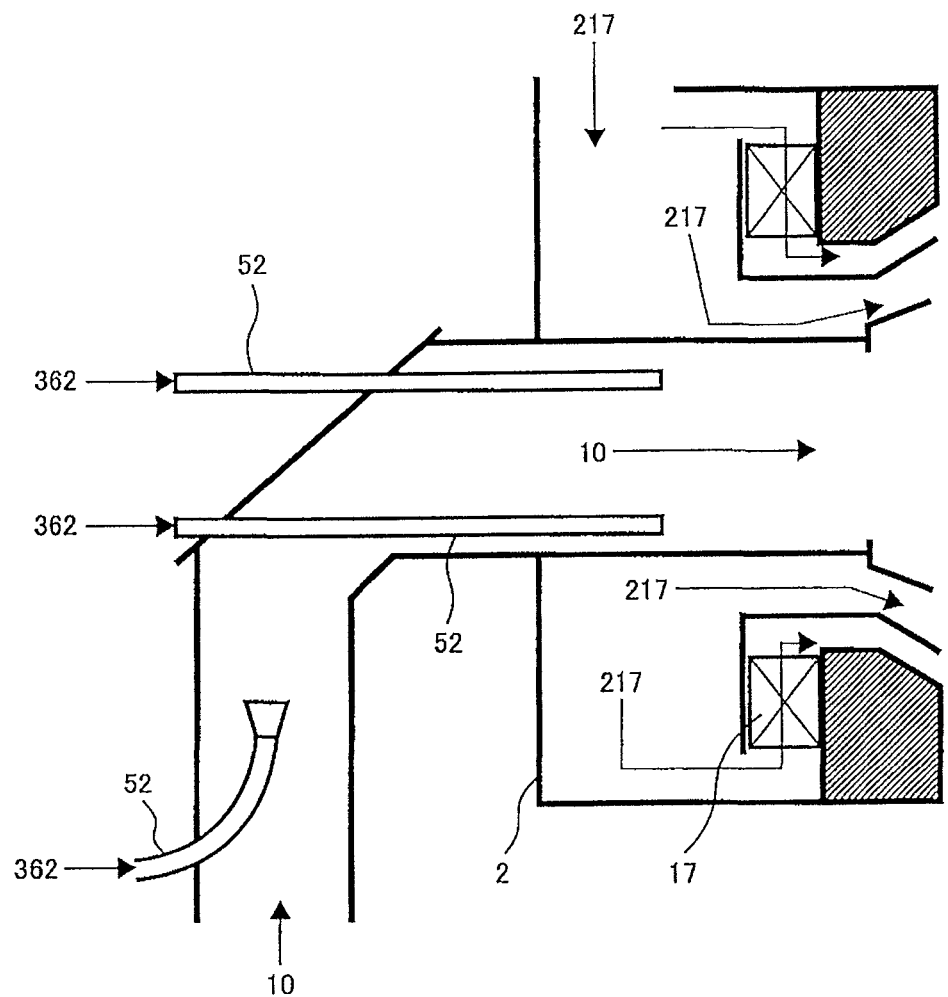
FIG. 14 is a drawing for illustrating a modification of the constitution of the vicinity of the burner relating to the fourth embodiment.

FIG. 14 shows a modification of the burner structure and the supply method of the oxygen gas 362. In this constitution, the oxygen supply nozzle on the downstream side is installed in the vicinity of the burner.

Figure 15:
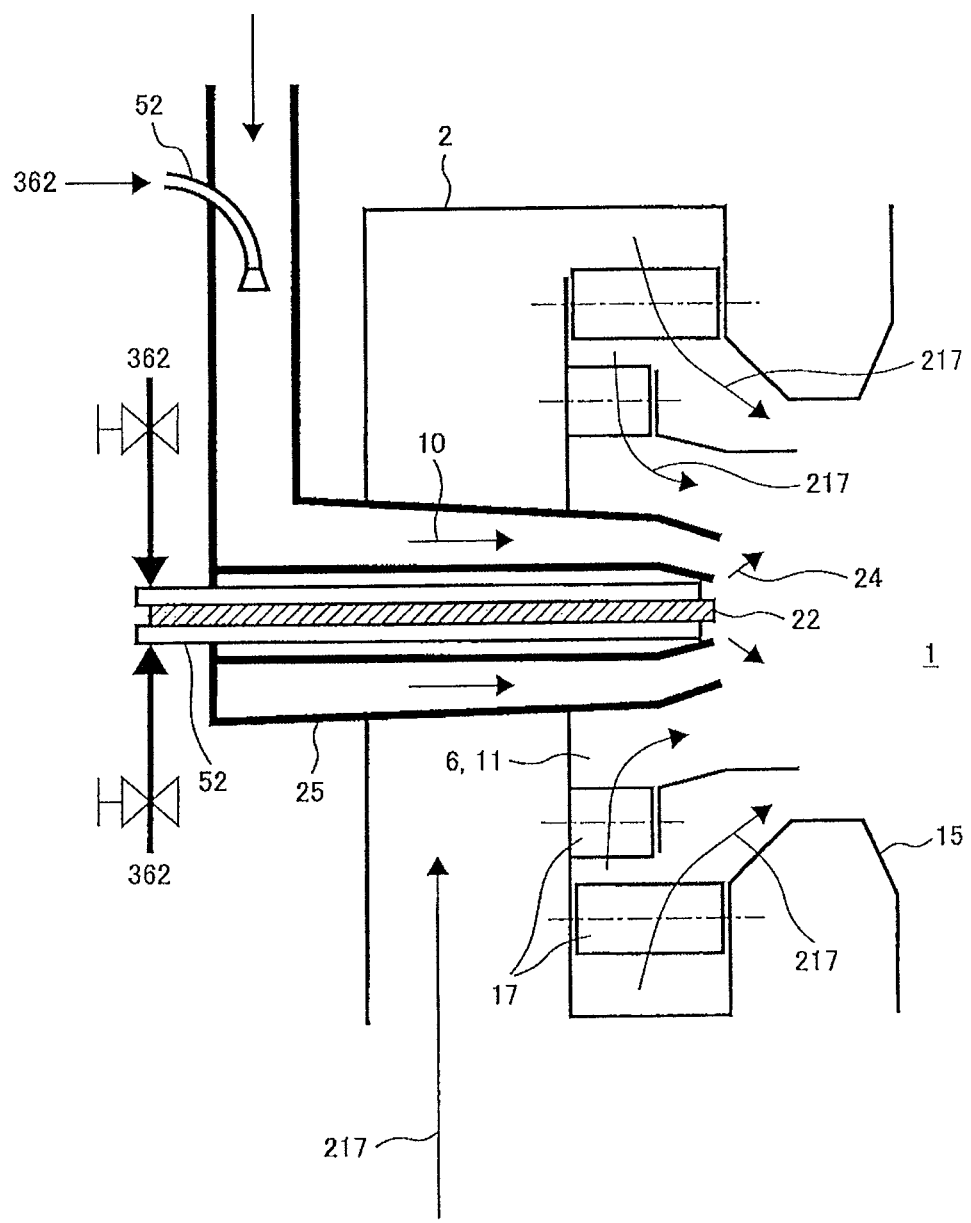
FIG. 15 is a drawing for illustrating another modification of the constitution of the vicinity of the burner relating to the fourth embodiment.

FIG. 15 shows another modification of the burner structure and the supply method of the oxygen gas 362. In this constitution, the oxygen supply nozzle 52 on the downstream side is installed at the burner exit. At the central part of the burner, a starting oil burner 22 is installed and around the oil burner 22, the oxygen supply nozzle 52 is installed. Around the oxygen supply nozzle 52, a primary nozzle 25 is installed and the primary gas 10 that is a mixture of pulverized coal and combustion exhaust gas is injected into a boiler furnace 1. Oxygen gas 24 is supplied from the inside of the primary gas 10 injected circularly. From the surrounding of the primary nozzle 25, the secondary system gas 217 is supplied into the boiler furnace 1. The secondary system gas is branched to two flow paths via a wind box 2, then is given the swirl component of the flow by a swirl vane 17, and is supplied into the boiler furnace 1. The oxygen supply nozzle 52 supplies the oxygen gas 362.

In the constitution shown in FIG. 15, the oxygen supply nozzle is installed on the downstream side of the burner, so there is a defect that in the primary system gas 10 in the burner portion, oxygen concentration irregularities are easily produced. On the other hand, when abnormal combustion such as a backfire occurs, there is an advantage that the influence is hardly exerted upon the upstream side in the primary nozzle 25.

Figure 16:
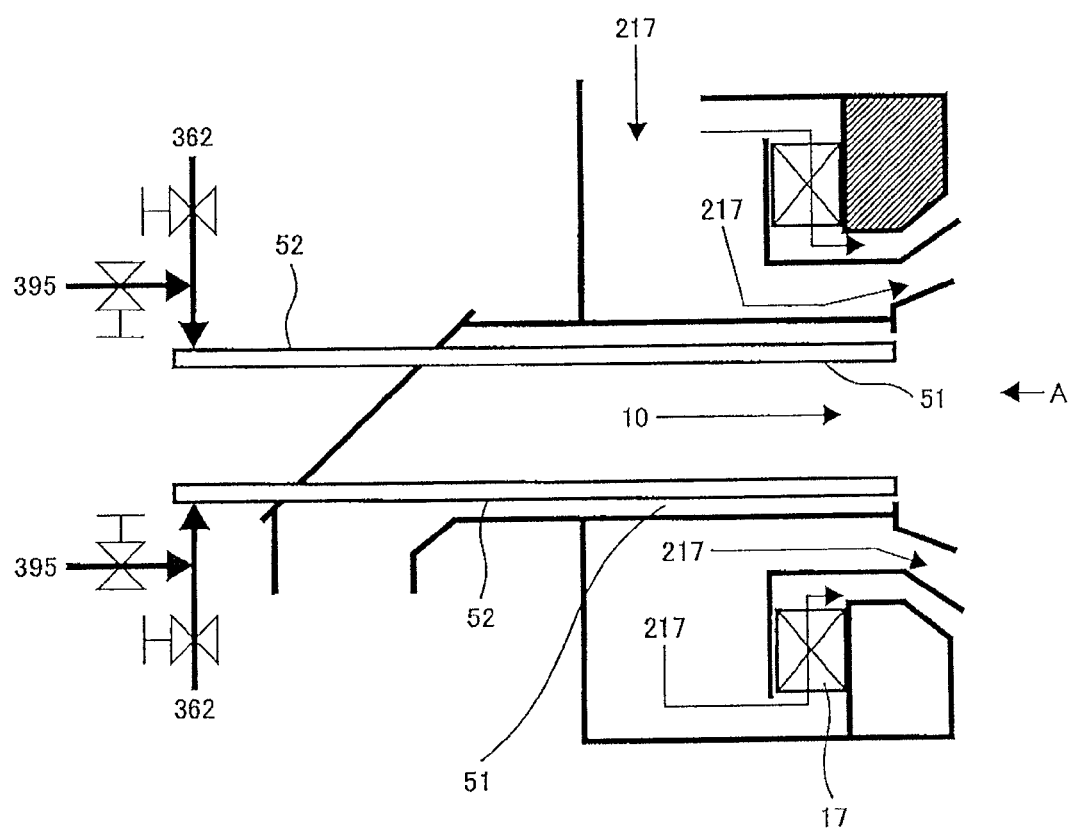
FIG. 16 is a drawing for illustrating still another modification of the constitution of the vicinity of the burner relating to the fourth embodiment.
Figure 17:
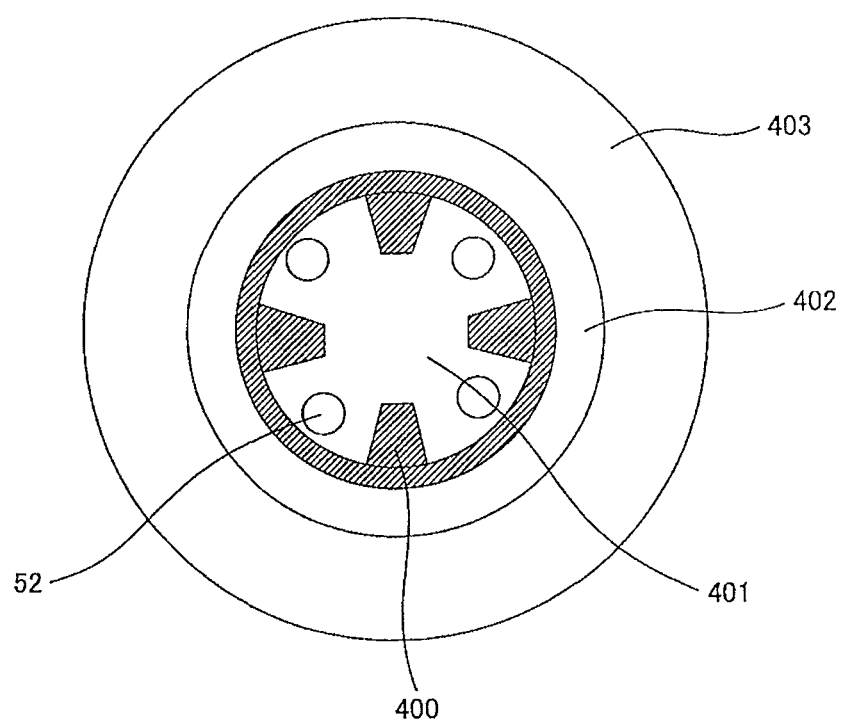
FIG. 17 is a drawing for illustrating in the direction A of the constitution of the burner shown in the FIG. 16.

FIG. 16 shows a modification of FIG. 14. A secondary gas lead-in pipe 51 is installed in the vicinity of the burner injection portion. FIG. 17 is a drawing when the burner is viewed in the direction A. On the outer periphery side of a primary nozzle 401, flame stabilizers 400 are installed in a comb teeth shape. Around the primary nozzle, a secondary nozzle 402 and a tertiary nozzle 403 are arranged concentrically. The oxygen supply nozzles 52 are arranged between the flame stabilizers 400.

What is claimed is:

1. An oxyfuel combustion boiler plant comprising:
an air separation unit for manufacturing oxygen by separating nitrogen from air, a boiler having a burner for burning the oxygen supplied from the air separation unit and pulverized coal and a primary system pipe for supplying the pulverized coal to the burner,
an exhaust gas recirculation system pipe for supplying combustion exhaust gas discharged from the boiler to the primary system pipe, and a carbon dioxide capture unit for capturing carbon dioxide in the exhaust gas discharged from the boiler,
characterized in that:
the oxyfuel combustion boiler plant is further comprising:
an oxygen buffer tank disposed on a downstream side of the air separation unit;
an oxygen supply pipe for supplying oxygen to the primary system pipe of the burner from the oxygen buffer tank; and
a nitrogen supply pipe for supplying a part of nitrogen generated from the air separation unit or an air supply pipe for supplying air from outside which is connected to the oxygen supply pipe on a downstream side of the oxygen buffer tank and on an upstream side of a junction of the primary system pipe.

2. The oxyfuel combustion boiler plant according to claim 1, wherein
the nitrogen supply pipe is provided with a stop valve capable of interrupting a flow of nitrogen.

3. The oxyfuel combustion boiler plant according to claim 1, wherein
an exit of the oxygen supply pipe is divided and disposed in a gas flow direction of the primary system pipe.

4. An operation method of an oxyfuel combustion boiler plant comprising: an air separation unit for manufacturing oxygen by separating nitrogen from air;
a boiler having a burner for burning the oxygen supplied from the air separation unit and pulverized coal and a primary system pipe for supplying the pulverized coal to the burner;
an exhaust gas recirculation system pipe for supplying combustion exhaust gas discharged from the boiler to the primary system pipe;
an air pipe for air-fuel combustion for supplying external air to the exhaust gas recirculation system pipe at time of air-fuel combustion;
a carbon dioxide capture unit for capturing carbon dioxide in the exhaust gas discharged from the boiler;
an oxygen buffer tank disposed on a downstream side of the air separation unit;
an oxygen supply pipe for supplying oxygen to the primary system pipe of the burner from the oxygen buffer tank; and
a nitrogen supply pipe for supplying a part of nitrogen generated from the air separation unit or an air supply pipe for supplying air from outside which is connected to the oxygen supply pipe on a downstream side of the oxygen buffer tank and on an upstream side of a junction of the primary system pipe;
the operation method of the oxyfuel combustion boiler plant is comprising the steps of:
supplying air from the air pipe for air-fuel combustion to the exhaust gas recirculation system pipe in an operation state of air-fuel combustion,
stopping the air supply from the air pipe for air-fuel combustion and supplying and burning the oxygen and the combustion exhaust gas to the boiler when shifting from the operation state of air-fuel combustion to an operation state of oxyfuel combustion, and
supplying nitrogen or air to the oxygen supply pipe from the nitrogen supply pipe or the air supply pipe which is connected to the oxygen supply pipe.

5. The operation method of an oxyfuel combustion boiler plant according to claim 4, wherein
increasing a particle diameter of the pulverized coal for supplying, when the shifting from the air-fuel combustion operation state to the oxyfuel combustion operation state.

6. The operation method of an oxyfuel combustion boiler plant according to claim 4, wherein
supplying the nitrogen or the air from the nitrogen supply pipe or the air supply pipe is started, prior to start of supply of the oxygen from the oxygen supply pipe to the primary system pipe, when shifting from the air-fuel combustion operation state to the oxyfuel combustion operation state.

* * * * *